(12) United States Patent
Heeter et al.

(10) Patent No.: US 11,835,064 B1
(45) Date of Patent: Dec. 5, 2023

(54) ELECTRIC FAN ARRAY FOR DISTORTION TOLERANCE OF TURBOFAN ENGINES

(71) Applicants: Rolls-Royce North American Technologies Inc., Indianapolis, IN (US); Rolls-Royce Corporation, Indianapolis, IN (US)

(72) Inventors: Robert W. Heeter, Indianapolis, IN (US); Daniel E. Molnar, Jr., Indianapolis, IN (US); Kathryn A. Sontag, Indianapolis, IN (US); Michael G. Meyer, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/089,029

(22) Filed: Dec. 27, 2022

(51) Int. Cl.

| | |
|---|---|
| *F04D 29/66* | (2006.01) |
| *F02C 3/04* | (2006.01) |
| *F02C 6/00* | (2006.01) |
| *F04D 25/06* | (2006.01) |
| *F04D 27/00* | (2006.01) |
| *F02C 9/16* | (2006.01) |

(52) U.S. Cl.
CPC ............ *F04D 29/661* (2013.01); *F02C 3/04* (2013.01); *F02C 6/00* (2013.01); *F02C 9/16* (2013.01); *F04D 25/06* (2013.01); *F04D 27/004* (2013.01); *F05D 2220/76* (2013.01)

(58) Field of Classification Search
CPC .......... B64D 35/04; F02K 3/077; F02C 3/107
See application file for complete search history.

(56) References Cited

U.S. PATENT DOCUMENTS

| | | | |
|---|---|---|---|
| 4,655,413 | A | 4/1987 | Genssler et al. |
| 7,637,455 | B2 | 12/2009 | Silkey et al. |
| 7,926,290 | B2 | 4/2011 | Johnson |
| 7,975,961 | B2 | 7/2011 | Silkey et al. |
| 10,704,418 | B2 | 7/2020 | Ramakrishnan et al. |
| 11,149,639 | B2 | 10/2021 | Duge |

(Continued)

FOREIGN PATENT DOCUMENTS

| | | |
|---|---|---|
| CN | 106441789 | 2/2017 |
| WO | 2020113110 | 6/2020 |

OTHER PUBLICATIONS

Justin M. Bailey, The Influence of Development and Fan/Screen Interaction on Screen-Generated Total Pressure Distortion Profiles, Dec. 5, 2013.

(Continued)

*Primary Examiner* — Ehud Gartenberg
*Assistant Examiner* — David P. Olynick
(74) *Attorney, Agent, or Firm* — Barnes & Thornburg LLP

(57) ABSTRACT

A gas turbine engine comprises an engine core and an electric fan array. The engine core includes a compressor, a combustor, and a turbine. The compressor compresses and delivers air to the combustor. The combustor mixes fuel with the compressed air received from the compressor and ignites the fuel. The hot, high-pressure products of the combustion reaction in the combustor are directed into the turbine to cause the turbine to rotate about an axis and drive the compressor. The electric fan array may include at least two non-concentric fans having parallel shafts.

20 Claims, 5 Drawing Sheets

(56) References Cited

U.S. PATENT DOCUMENTS

| | | | |
|---|---|---|---|
| 2006/0185346 A1* | 8/2006 | Rolt | F02K 3/06 60/226.1 |
| 2012/0292440 A1* | 11/2012 | Kosheleff | F01D 15/00 244/1 N |
| 2016/0076444 A1* | 3/2016 | Bailey Noval | F02K 3/06 415/68 |
| 2019/0138663 A1 | 5/2019 | Ferrar et al. | |

OTHER PUBLICATIONS

Aaron Drake et al., Environmentally Responsible Aviation N+2 Advanced Vehicle Study: Final Technical Report, Apr. 30, 2013.

* cited by examiner

ELECTRIC FAN ARRAY FOR DISTORTION TOLERANCE OF TURBOFAN ENGINES

STATEMENT REGARDING FEDERALLY SPONSORED RESEARCH OR DEVELOPMENT

Embodiments of the present disclosure were made with government support under Contract No. FA8650-19-D-2063. The government may have certain rights.

FIELD OF THE DISCLOSURE

The present disclosure relates generally to gas turbine engines, and more specifically to distortion mitigation in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The gas turbine engine may include mitigation systems to reduce pressure and swirl distortions.

SUMMARY

The present disclosure may comprise one or more of the following features and combinations thereof.

A gas turbine engine may include an outer case, an engine core, and a fan system. The outer case may extend circumferentially around an axis of the gas turbine engine to define a portion of a flow path of the gas turbine engine. The engine core may be arranged radially inward of the outer case that extends along the axis of the gas turbine engine. The fan system may be configured to provide thrust for the gas turbine engine and may adapt to different flow conditions to help offset and minimize the pressure and swirl distortions in the gas turbine engine.

In some embodiments, the engine core may include a compressor, a combustor, and a turbine. The compressor may be configured to rotate about the axis of the gas turbine engine to compress the air that flows into the engine core. The combustor may be configured to receive the compressed air from the compressor. The turbine may be coupled to the compressor and may be configured to rotate about the axis of the gas turbine engine in response to receiving hot, high-pressure products of the combustor to drive rotation of the compressor.

In some embodiments, the fan system may include a fan array and a control unit. The fan array may be located axially forward of the engine core that replaces a mechanically driven fan. The control unit may be coupled to the fan array.

In some embodiments, the fan array may have a plurality of electric fans spaced apart around the axis of the gas turbine engine that are each configured to rotate about a fan axis. The control unit may be configured to vary individually a rotation speed of each electric fan included in the fan array in response to a pressure differential in the flow path of the gas turbine engine upstream of the engine core to minimize pressure and swirl distortions in the gas turbine engine.

In some embodiments, the control unit may include a plurality of sensors and a controller. The plurality of sensors may be arranged to measure pressure within the flow path of the gas turbine engine upstream of the engine core. The controller may be coupled to the plurality of sensors to receive pressure measurements from the plurality of sensors.

In some embodiments, the controller may be configured to increase the rotation speed of at least one electric fan included in the fan array in response to the pressure measurement being above a predetermined threshold. The controller may be configured to decrease the rotation speed of at least one electric fan included in the fan array in response to the pressure measurement being below the predetermined threshold.

In some embodiments, the control unit may further include a memory coupled to the controller. The memory may include a plurality of preprogrammed aircraft maneuvers that each correspond to a predetermined speed profile for the fan array. The controller may be configured to detect a preprogrammed aircraft maneuver included in the plurality of preprogrammed aircraft maneuvers on the memory and direct the fan array to change to the corresponding predetermined speed profile in response to detecting the preprogrammed aircraft maneuver.

In some embodiments, the control unit may include a controller and a memory coupled to the controller. The memory may include a plurality of preprogrammed aircraft maneuvers that each correspond to a predetermined speed profile for the fan array. The controller may be configured to detect a preprogrammed aircraft maneuver included in the plurality of preprogrammed aircraft maneuvers on the memory and direct the fan array to change to the corresponding predetermined speed profile in response to detecting the preprogrammed aircraft maneuver.

In some embodiments, the control unit may include a power supply. The power supply may be coupled to each electric fan included in the fan array to provide power to each electric fan and drive rotation of each electric fan.

In some embodiments, the power supply may include a generator and batteries. The generator may be coupled to the engine core to produce electricity during use of the engine core. The batteries may be coupled to the generator to store electricity produced by the generator.

In some embodiments, the plurality of electric fans may include a central electric fan and outer electric fans. The central electric fan may have a fan axis aligned with the axis of the gas turbine engine. The outer electric fans may be spaced apart around the axis of the gas turbine engine to surround the central electric fan.

In some embodiments, the outer case may have a non-circular cross-section. The fan array may be a rectangular cross-section. The fan array may be a parallelogram cross-section.

In some embodiments, the fan system may further include a secondary fan array axially aft of the fan array and axially forward of the engine core. The secondary fan array may include a plurality of electric fans arranged to fill gaps between adjacent electric fans included in the plurality of electric fans of the fan array axially forward of the secondary fan array.

According to another aspect of the present disclosure, a gas turbine engine may include an outer case, an engine core, and a fan system. The outer case may extend circumferentially around an axis of the gas turbine engine to define a portion of a flow path of the gas turbine engine. The engine core may be arranged radially inward of the outer case that extends along the axis of the gas turbine engine.

In some embodiments, the fan system may include a fan array and a control unit. The fan array may be located axially forward of the engine core. The control unit may be coupled to the fan array.

In some embodiments, the fan array may have a plurality of electric fans spaced apart around the axis of the gas turbine engine that are each configured to rotate about a fan axis. The control unit may be configured to vary individually a rotation speed of each electric fan included in the fan array in response to a pressure differential in the flow path of the gas turbine engine upstream of the engine core.

In some embodiments, the control unit may include a plurality of sensors and a controller. The plurality of sensors may be arranged to measure pressure within the flow path of the gas turbine engine upstream of the engine core. The controller may be coupled to the plurality of sensors to receive pressure measurements from the plurality of sensors.

In some embodiments, the controller may be configured to increase the rotation speed of at least one electric fan included in the fan array in response to the pressure measurement being above a predetermined threshold. The controller may be configured to decrease the rotation speed of at least one electric fan included in the fan array in response to the pressure measurement being below the predetermined threshold.

In some embodiments, the control unit may include a controller and a memory coupled to the controller. The memory may include a plurality of preprogrammed aircraft maneuvers that each correspond to a predetermined speed profile for the fan array. The controller may be configured to detect a preprogrammed aircraft maneuver included in the plurality of preprogrammed aircraft maneuvers on the memory and direct the fan array to change to the corresponding predetermined speed profile in response to detecting the preprogrammed aircraft maneuver.

In some embodiments, the plurality of electric fans may include a central electric fan with a fan axis aligned with the axis of the gas turbine engine and outer electric fans. The outer electric fans may be spaced apart around the axis of the gas turbine engine to surround the central electric fan.

In some embodiments, the outer case may have a non-circular cross-section. The fan array may have one of a rectangular cross-section and a parallelogram cross-section.

In some embodiments, the fan system may further include a secondary fan array axially aft of the fan array and axially forward of the engine core. The secondary fan array may include a plurality of electric fans arranged to fill gaps between adjacent electric fans included in the plurality of electric fans of the fan array axially forward of the secondary fan array.

According to another aspect of the present disclosure, a method may include providing a gas turbine engine. The gas turbine engine may include an outer case arranged around an axis of the gas turbine engine, an engine core arranged radially inward of the outer case, and a fan system, the fan system including a fan array located radially inward of the outer case and axially forward of the engine core. The fan array may have a plurality of electric fans spaced apart around the axis that are each configured to rotate about a fan axis.

In some embodiments, the method may further include conducting a flow of air through a flow path of the gas turbine engine, measuring pressure of the flow of air in the flow path of the gas turbine engine axially forward of the engine core, and varying a rotation speed of at least one electric fan included in the fan array. The rotation speed of the electric fans may be varied in response to the pressure measurements being above or below a predetermined threshold to minimize pressure and swirl distortions in the gas turbine engine.

These and other features of the present disclosure will become more apparent from the following description of the illustrative embodiments.

DETAILED DESCRIPTION OF THE DRAWINGS

Figure 1:
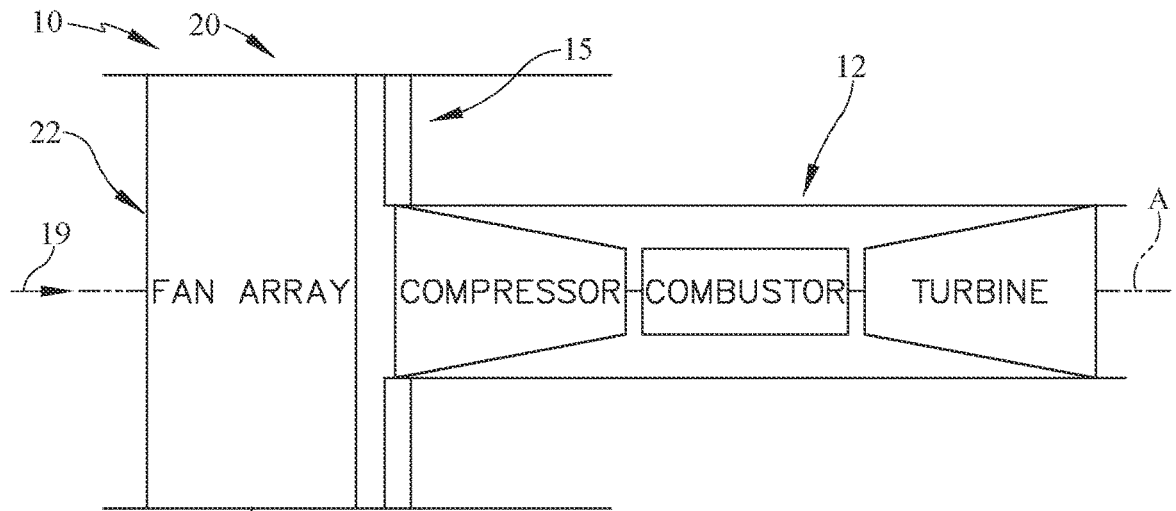
FIG. 1 is a diagrammatic view of a gas turbine engine that includes an engine core and a fan system including a fan array configured to replace a primary fan of the gas turbine engine to provide thrust for the gas turbine engine and to help offset and minimize the pressure and swirl distortions in the gas turbine engine.

For the purposes of promoting an understanding of the principles of the disclosure, reference will now be made to a number of illustrative embodiments illustrated in the drawings and specific language will be used to describe the same.

Figure 2:
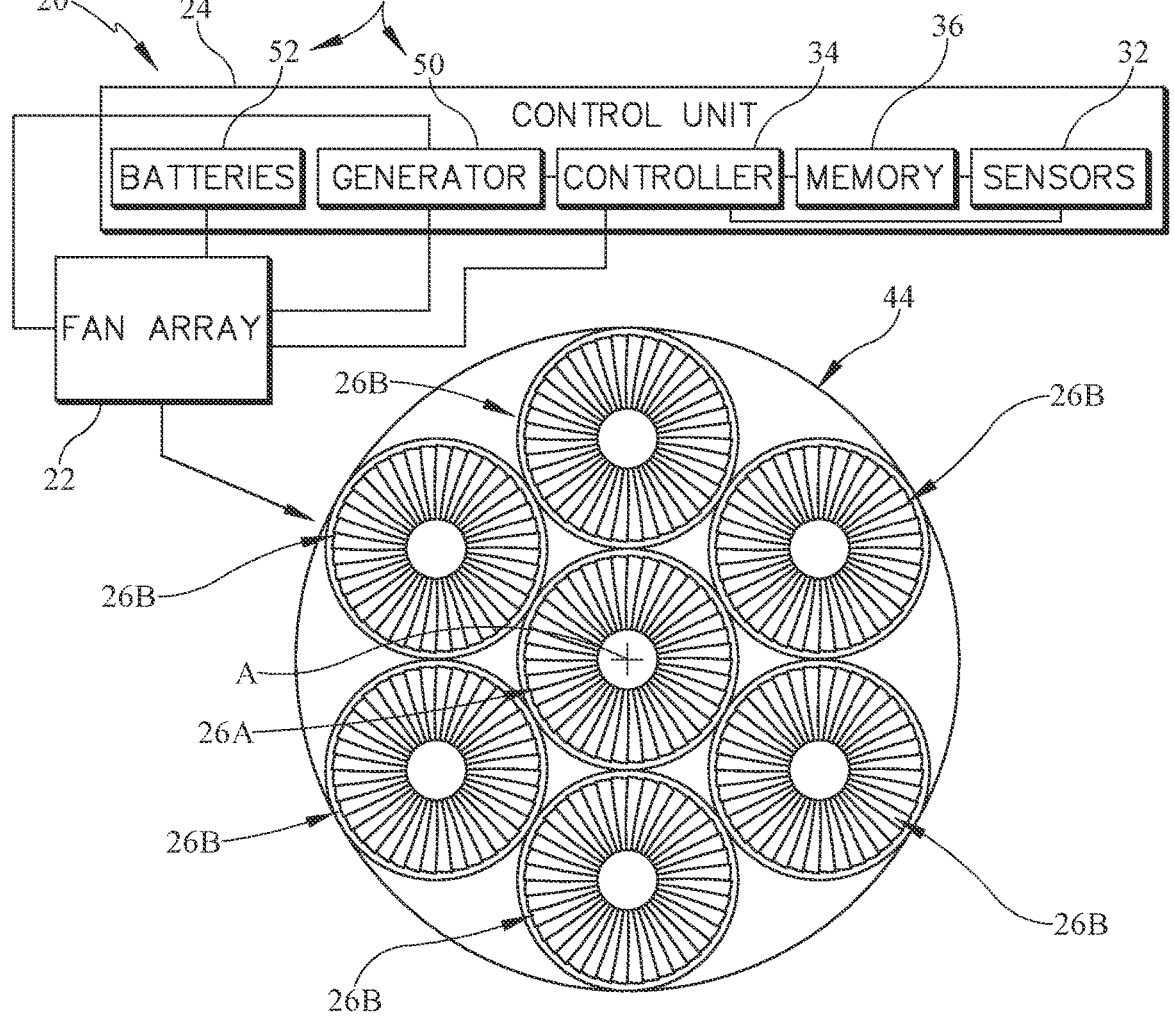
FIG. 2 is a diagrammatic and cross-section view of the gas turbine engine of FIG. 1 showing the fan system includes the fan array having a plurality of electric fans spaced apart around the axis of the gas turbine engine and a control unit coupled to the fan array to individually control the rotation speed of each electric fan included in the fan array in response to a pressure differential in the flow path of the gas turbine engine upstream of the engine core.
Figure 3:
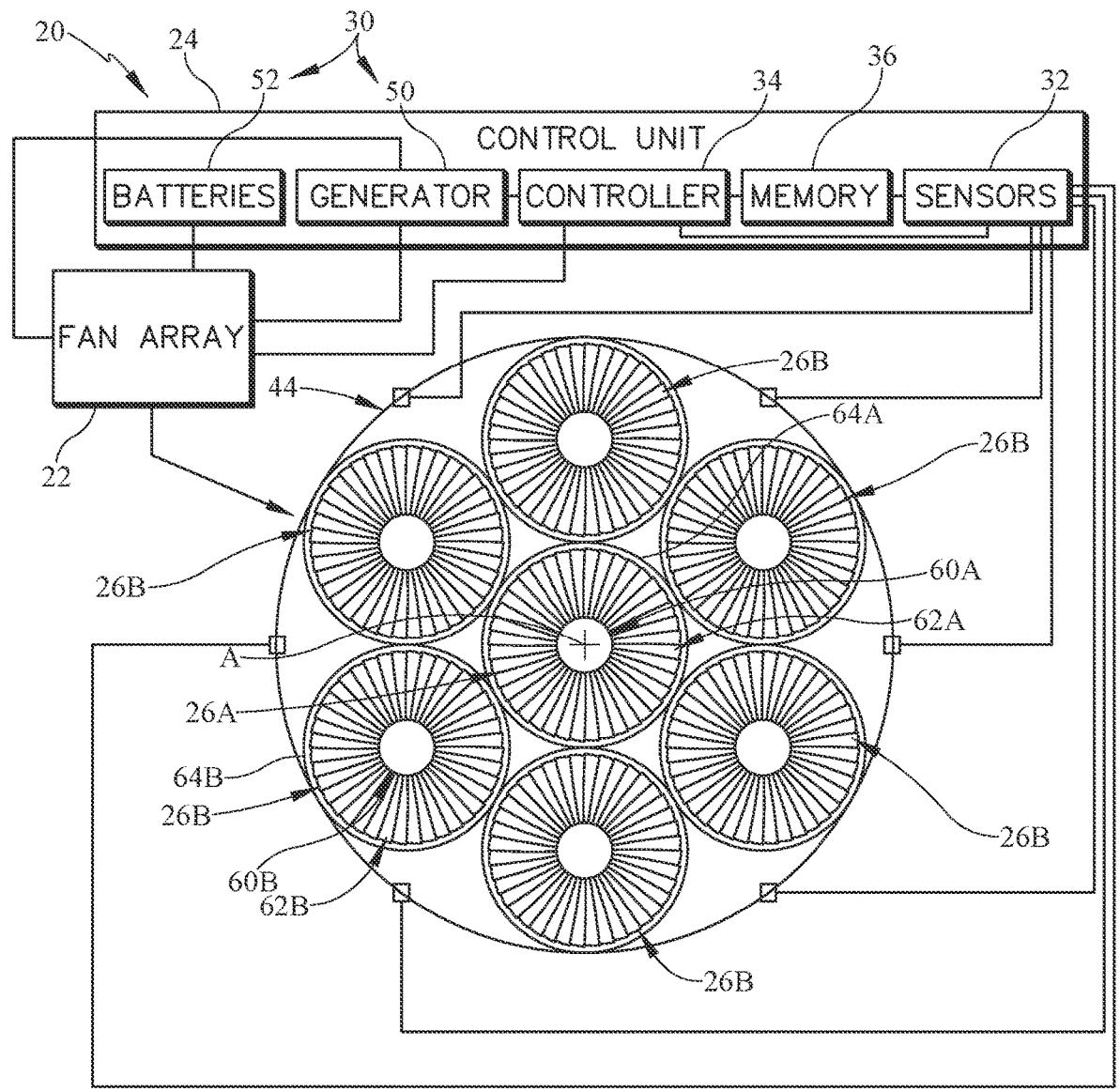
FIG. 3 is view similar to FIG. 2 showing the plurality of electric fans included in the fan array are arranged in a circular array shape such that the plurality of electric fans includes a center electric fan and outer electric fans spaced apart around the axis of the gas turbine engine to surround the center electric fan.

An illustrative aerospace gas turbine engine 10 includes an engine core 12 and a fan system 20 as shown in FIGS. 1-3. The engine core 12 is mounted for rotation about an axis A of the gas turbine engine 10 to provide thrust. The fan system 20 includes a fan array 22 located axially forward of the engine core 12 and configured to provide thrust for the gas turbine engine 10 and adapt to different flow conditions to help offset and minimize the pressure and swirl distortions in the gas turbine engine 10.

The fan system 20 includes the fan array 22 and a control unit 24 as shown in FIGS. 1-3. The fan array 22 has a plurality of electric fans 26A, 26B, spaced apart around the axis A of the gas turbine engine 10. The control unit 24 is coupled to the fan array 22 to individually control the rotation speed of each electric fan 26A, 26B included in the fan array 22. The control unit 24 is configured to vary the rotation speed of the fans 26A, 26B in response to a pressure differential in a flow path 19 of the gas turbine engine 10 upstream of the engine core 12.

Embedded engines on an aircraft may experience high distortion in the form of pressure gradients and swirl. The pressure and swirl distortions may cause engine stall or other undesirable aeromechanical behavior. Therefore, the gas turbine engine 10 includes the fan system 20 with a plurality of electric fans 26A, 26B which allow for individual control of various flows around the circumference of the gas turbine engine 10. By varying the speeds of the different electric fans around the circumference of the engine 10, the pressure and swirl distortions may be offset.

The fan array 22 of the fan system 20 replaces the mechanically driven fan in the illustrative embodiment. The plurality of electric fans 26A, 26B replaces the mechanical fan of the gas turbine engine 10. The plurality of electric fans 26A, 26B that include a central electric fan 26A and outer electric fans 26B. The center electric fan 26A has a fan axis that is aligned with the axis A of the gas turbine engine 10.

The control unit 24 includes a power supply 30, sensors 32, a controller 34 including a processor, and a memory 36 as shown in FIGS. 2. The power supply 30 is coupled to each of the electric fans 26A, 26B to provide power to each of the electric fans 26A, 26B. The plurality of sensors 32 arranged to measure pressure within the flow path 19 of the gas turbine engine 10 upstream of the engine core 12. The controller 34 is coupled to each of the electric fans 26A, 26B and the power supply 30. The controller 34 is also coupled to the plurality of sensors 32 to receive pressure measurements from the plurality of sensors 32. The memory 36 is coupled to the controller 34 and has a plurality of preprogrammed aircraft maneuvers that each correspond to a predetermined speed profile for the fan array 22.

Based on the pressure measurements and/or the detected preprogrammed aircraft maneuvers, the controller 34 is configured to individually increase, decrease, and/or maintain the speed of each of the electric fans 26A, 26B. The controller 34 is configured to increase the rotation speed of at least one electric fan 26A, 26B included in the fan array 22 in response to the pressure measurement from the sensors 32 being above a predetermined threshold. The controller 34 is configured to decrease the rotation speed of at least one electric fan 26A, 26B included in the fan array 22 in response to the pressure measurement being below the predetermined threshold.

The controller 34 may also be configured to maintain the rotation speed of at least one electric fan 26A, 26B included in the fan array 22 if the pressure measurements are within the predetermined threshold. Alternatively, the controller 34 may be configured to stop rotation of at least one electric fan 26A, 26B included in the fan array 22 if the pressure measurements are within the predetermined threshold.

In the illustrative embodiment, the controller 34 is configured to increase the rotation speed of the electric fan or fans 26A, 26B included in the fan array 22 at or near the area of the flow path 19 where the pressure measurement from the sensors 32 is above a predetermined threshold. Similarly, the controller 34 is configured to decrease the rotation speed of the electric fan or fans 26A, 26B included in the fan array 22 at or near the area of the flow path 19 where the pressure measurement from the sensors 32 is below a predetermined threshold.

For instance, the controller 34 may direct electric fans 26A, 26B at one location around the circumference of the engine 10 to increase rotation speed, while also directing other electric fans 26A, 26B included in the fan array 22 at another location to decrease in rotation speed. Whether the speed of each of the electric fans 26A, 26B is increased, decreased, and/or maintained depends on the pressure gradient in the flow path 19 of the engine 10. In areas of high pressure, the rotation speed of the fans 26A, 26B is increased. In areas of low pressure, the rotation speed of the fans 26A, 26B is decreased. In areas where the pressure is within the desired threshold, the speed of the fans 26A, 26B may be maintained.

The controller 34 is also configured to maintain demanded thrust for the engine 10. Therefore, the controller 34 is configured to vary the rotation speed of the fans 26 to adjust the pressure while still meeting the overall thrust needed for the engine 10. Therefore, mitigation speeds may be relative to the overall distribution of pressure.

The controller 34 is also configured to detect a preprogrammed aircraft maneuver included in the plurality of preprogrammed aircraft maneuvers on the memory 36. The controller 34 is configured to direct the fan array 22 to change to the corresponding predetermined speed profile in response to detecting the preprogrammed aircraft maneuver.

The predetermined speed profile includes a preset speed and position for each of the fans 26A, 26B included in the fan array 22. For example, based on the preprogrammed aircraft maneuver, i.e. banks, turns, rolls, etc., the pressure gradient experienced by the gas turbine engine 10 can be predicted such that the rotation speed of the fans 26A, 26B can be altered preemptively to minimize the distortions. The speed and position of each fan 26A, 26B creates the predetermined speed profile that corresponds to the aircraft maneuver so that whenever the controller 34 detects the preprogrammed aircraft maneuver, the controller 34 directs the fan array 22 to the corresponding predetermined speed profile to counter the predicted pressure distortions that will result from the aircraft maneuver.

In some embodiments, other sensors on the aircraft may detect different orientations of the aircraft that correspond to one of the preprogrammed aircraft maneuvers and provide the information to the controller 34. The controller 34 is configured to direct the fan array 22 to change to the corresponding predetermined speed profile in response to the other sensor detecting the preprogrammed aircraft maneuver. In the illustrative embodiment, the controller 34 may be configured to use a combination of the pressure measurements and the detected preprogrammed aircraft maneuver to control the rotation speeds of each of the electric fans 26A, 26B.

In some embodiments, the plurality of electric fans 26A, 26B may each be configured to pivot relative to an outer case 44 of the gas turbine engine 10. The controller 34 may be configured to direct at least one of the electric fans 26A, 26B to pivot in response to the pressure measurements from the plurality of sensors 32.

Each of the electric fans 26A, 26B included in the fan array 22 may include a holder and an actuator (not shown). The holder allows the fan 26A, 26B to be pivoted relative to the outer case 44. The actuator is coupled the controller 34.

The controller 34 may be configured to direct the actuator to pivot the fan 26A, 26B so as to change the direction the fan 26A, 26B is facing. Altering the direction of the fans 26A, 26B may help mitigate swirl or allow for more active tailoring of distortion response.

Turning again to the gas turbine engine 10, the gas turbine engine 10 includes the engine core 12, a plurality of struts 15, the fan system 20, and an outer case 44 as shown in FIGS. 1-3. The plurality of struts 15 may be outlet guide vanes that each extend between the outer case 44 and the engine core 12. The struts 15 are spaced apart circumferentially around the axis A. In the illustrative embodiment, the electric fans 26A, 26B are axially forward of the struts 15.

In the illustrative embodiment, the outer case 44 extends circumferentially around the axis A of the gas turbine engine 10 radially outward of the fan array 22 to define a portion of the flow path 19 of the gas turbine engine 10. The engine core 12 is arranged radially inward of the outer case 44 to create a bypass duct between the outer case 46 and the engine core 12 as shown in FIG. 1.

The engine core 12 includes a compressor 14, a combustor 16, and a turbine 18 as shown in FIG. 1. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis A and drive the compressor 14.

Figure 4:
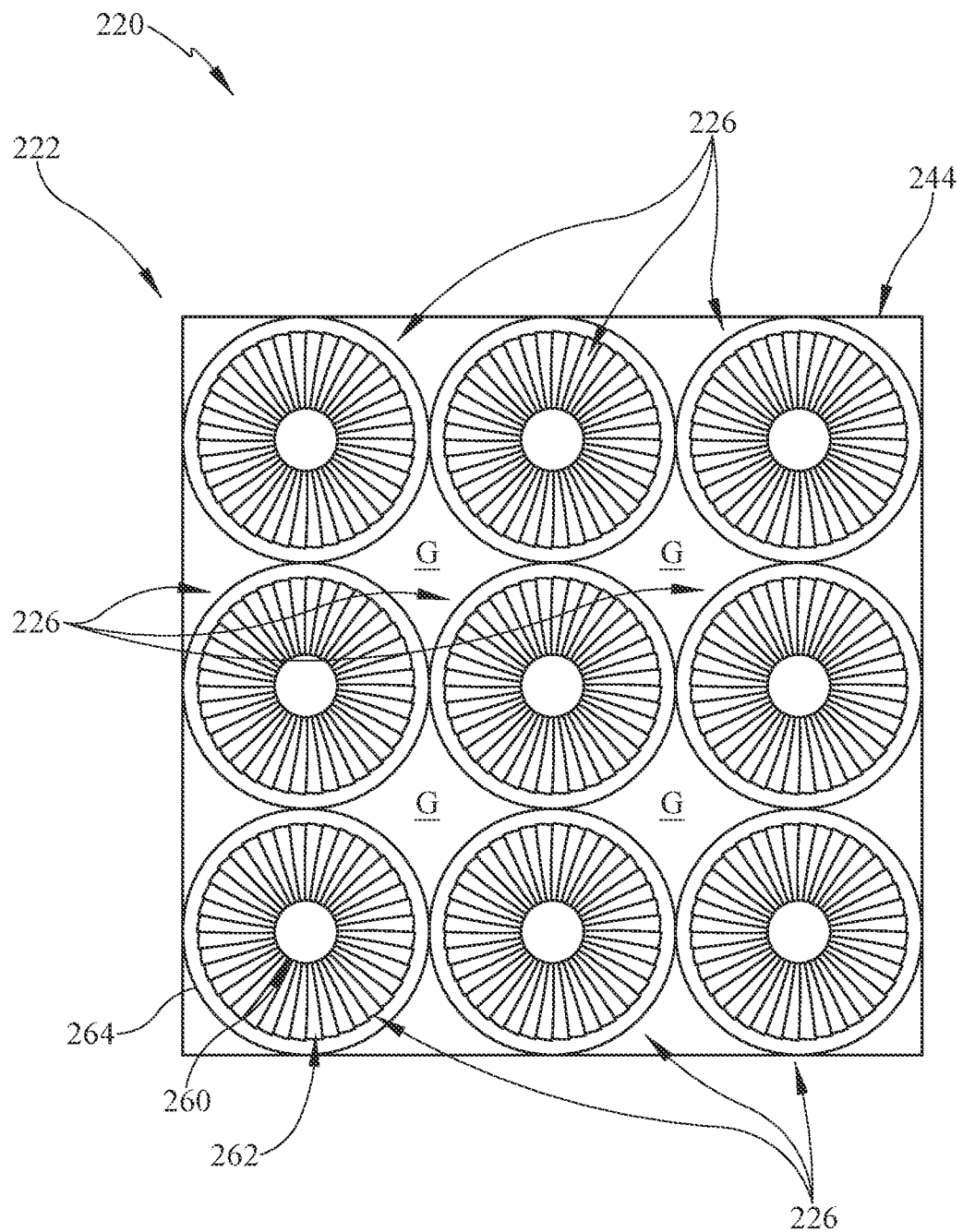
FIG. 4 is a diagrammatic and cross-section view of another embodiment of a fan system for a gas turbine engine configured to replace the primary fan for the gas turbine engine showing the fan system includes a fan array with a rectangular array shape.
Figure 5:
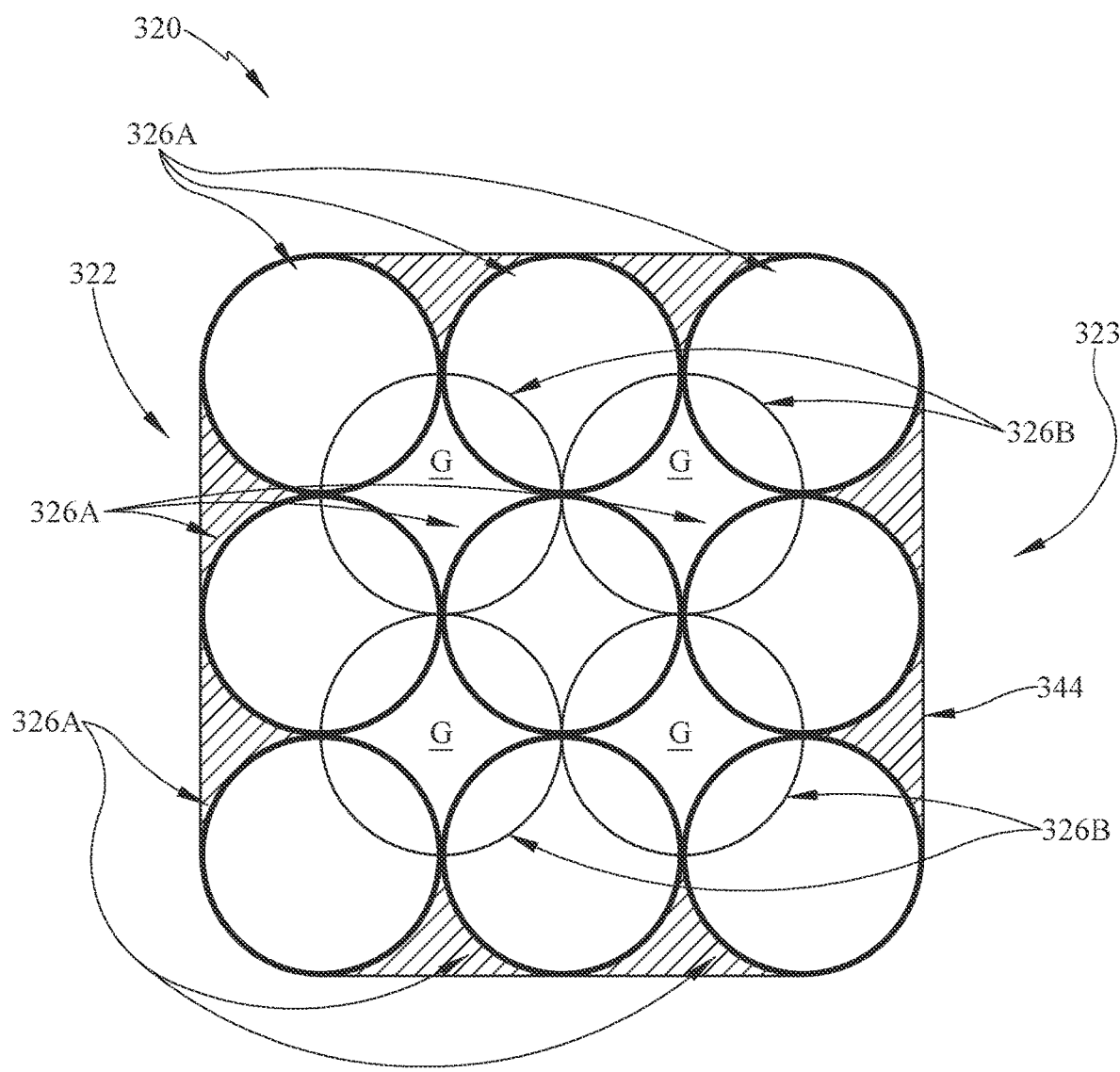
FIG. 5 is a diagrammatic and cross-section view of another embodiment of a fan system for a gas turbine engine configured to replace the primary fan showing the fan system includes a first fan array with a rectangular array shape and a second fan array located axially aft of the first fan array to fill in the gaps between the electric fans included in the first fan array.
Figure 6:
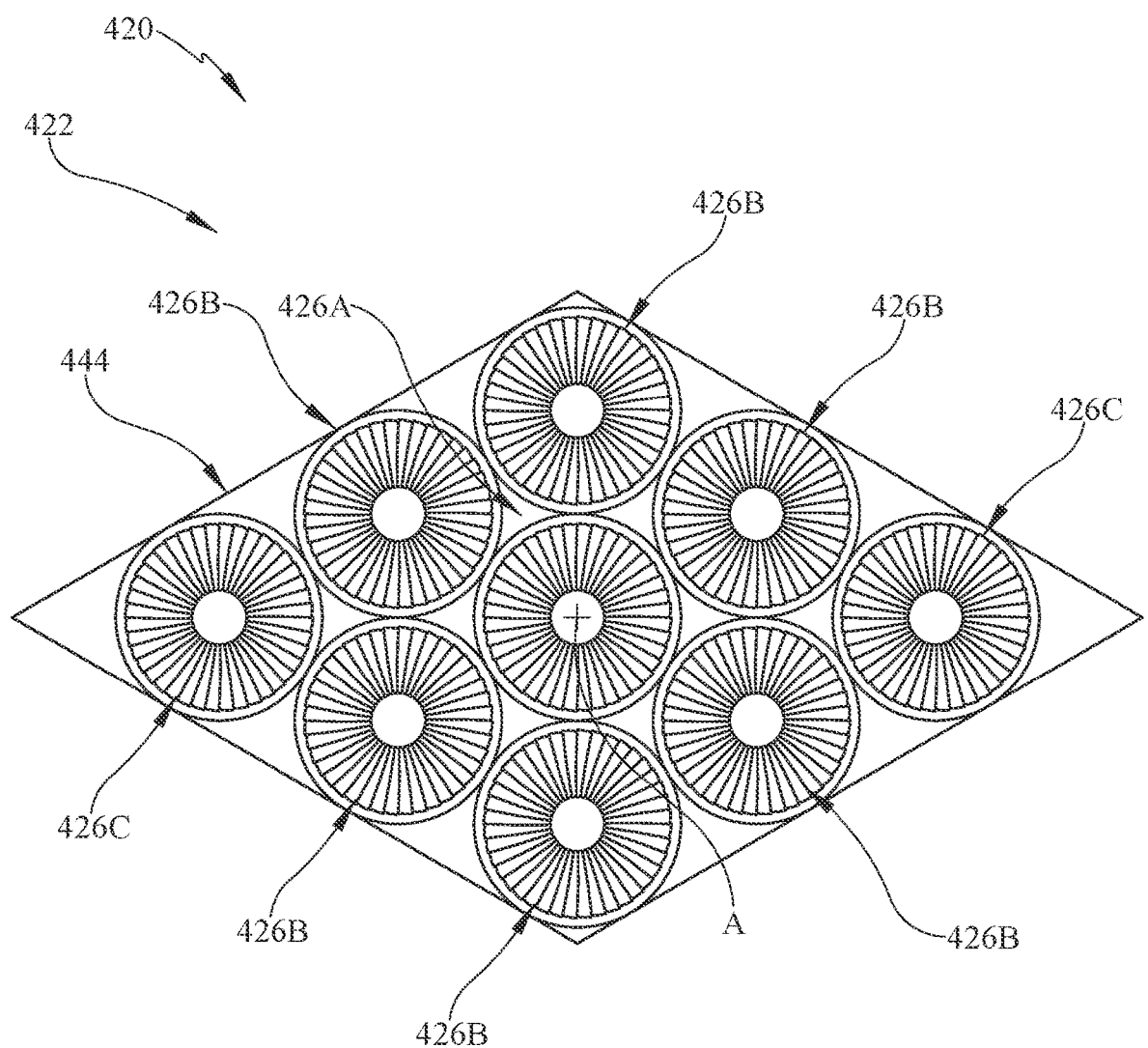
FIG. 6 is a diagrammatic and cross-section view of another embodiment of a fan system for a gas turbine engine configured to replace the primary fan showing the fan system includes a fan array with a parallelogram array shape.

The fan system 20 includes the fan array 22 and the control unit 24 as shown in FIGS. 1-3. The fan array 22 includes the plurality of electric fans 26A, 26B. The fan array 22 is circular in the illustrative embodiment. In other embodiments, the fan array 22 may be non-circular, like as shown in FIGS. 4-6.

The fan array 22 includes the plurality of electric fans 26A, 26B as shown in FIGS. 2-3. The plurality of electric fans 26A, 26B include the center fan 26A and the outer fans 26B. In the illustrative embodiment, the center and outer fans 26A, 26B have the same diameter. In other embodiments, the center fan 26A may have a greater diameter than the outer electric fans 26B.

In the illustrative embodiment, each electric fan 26A, 26B has a rotor 60A, 60B, blades 62A, 62B, and an inner fan case or nacelle 64A, 64B as shown in FIG. 3. The nacelles 64A, 64B of the electric fans 26A, 26B have the same length in the illustrative embodiment. In other embodiments, the nacelle 64A of the center fan 26A may have an axial length that is greater than or less than the axial length of the nacelles 64B for the outer electric fans 26B.

The control unit 24 is coupled to the fan array 22 to individually control the rotation speed of each electric fan 26A, 26B included in the fan array 22. The control unit 24 includes the power supply 30, the sensors 32, the controller 34, and the memory 36 as shown in FIG. 2.

The power supply 30 can be any suitable source of power or electricity. In the illustrative embodiment, the power supply 30 includes a generator 50 and batteries 52 as shown in FIG. 2. The generator 50 is coupled to the engine core 12 to produce electricity during use of the engine core 12 in the illustrative embodiment. The generator 50 is coupled to the fan array 22 to supply power to the fan array 22 to drive rotation of the plurality of electric fans 26A, 26B. The batteries 52 are coupled to the generator 50 to store electricity produced by the generator 50. The batteries 52 are also coupled to the fan array 22 to supply power to the fan array 22.

In the illustrative embodiment, the generator 50 may be coupled to a second engine core or small turboshaft. In the illustrative embodiment, additional generators 50 may be included in the aircraft to power the auxiliary fan system 20.

In the illustrative embodiment, the batteries 52 may supplement the power supplied by the generator 50 to the fan array 22. The batteries 52 may supply power to the fan array 22 during takeoff of the aircraft and/or other higher demand conditions. In some embodiments, the batteries 52 may supply power to the fan array 22 during cruise conditions or low demand conditions. In the illustrative embodiment, the batteries 52 are charged during cruise or low demand conditions.

In the illustrative embodiment, the sensors 32 may be spaced apart around the circumference of the outer case 44. The sensors 32 measure pressure gradients within the flow path 19. In other embodiments, the sensors 32 may measure other characteristics of the flow of air through the flow path 19.

Based on the measurements from the sensors 32 and/or the detected preprogrammed aircraft maneuvers detected, the controller 34 is configured to individually vary the speed of each of the electric fans 26A, 26B. The controller 34 is configured to increase the rotation speed of at least one electric fan 26A, 26B included in the fan array 22 in response to the pressure measurement from the sensors 32 being above a predetermined threshold. The controller 34 is configured to decrease the rotation speed of at least one electric fan 26A, 26B included in the fan array 22 in response to the pressure measurement being below the predetermined threshold.

The controller 34 may also be configured to maintain the rotation speed of at least one electric fan 26A, 26B included in the fan array 22 if the pressure measurements are within the predetermined threshold. Alternatively, the controller 34 may be configured to stop rotation of at least one electric fan 26A, 26B included in the fan array 22 if the pressure measurements are within the predetermined threshold.

The controller 34 is also configured to detect a preprogrammed aircraft maneuver included in the plurality of preprogrammed aircraft maneuvers on the memory 36. In some embodiments, other sensors on the aircraft may detect different orientations of the aircraft that correspond to one of the maneuvers In the illustrative embodiment, the plurality of electric fans 26A, 26B are each configured to pivot relative to the outer case 44. The controller 34 is configured to direct at least one of the electric fans 26A, 26B to pivot in response to the pressure measurements from the plurality of sensors 32.

In the illustrative embodiment, each electric fan 26A, 26B in the fan array 22 may be set to a different rotation speed during use of the gas turbine engine 10 based on the measurements from the sensors 32 and/or the detected preprogrammed aircraft maneuvers. Additionally, each electric fan 26A, 26B may be set at a different direction based on the measurements from the sensors 32 and/or the detected preprogrammed aircraft maneuvers.

A method of operating the fan system 20 during operation of the gas turbine engine 10 includes several steps. During operation of the gas turbine engine, a flow of air is conducted through the engine 10. The flow of air flows through the fan array 22 and enters through an inlet of the engine core 12, where the compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis A and drive the compressor 14.

As the flow of air is conducted through the engine 10, the pressure sensors 32 measure the pressure within the flow path 19 axially forward or upstream of the engine core 12. Based on the pressure measurements being above, below, or within the predetermined threshold, the controller 34 directs the electric fans 26A, 26B of the fan array 22 to increase, decrease, or maintain rotation speed.

The controller 34 is configured to increase the rotation speed of at least one electric fan 26A, 26B included in the fan array 22 in response to the pressure measurement from the sensors 32 being above a predetermined threshold. The controller 34 is configured to decrease the rotation speed of at least one electric fan 26A, 26B included in the fan array 22 in response to the pressure measurement being below the predetermined threshold. The controller 34 is also configured to maintain the rotation speed of at least one electric fan 26A, 26B included in the fan array 22 if the pressure measurements are within the predetermined threshold.

Alternatively, or in combination with the pressure measurements, the controller 34 is configured to vary the rotation speed of the electric fans 26A, 26B in response to detecting a preprogrammed aircraft maneuver included in the plurality of preprogrammed aircraft maneuvers on the memory 36. The controller 34 is configured to direct the fan array 22 to change to the corresponding predetermined speed profile in response to detecting the preprogrammed aircraft maneuver.

Alternatively, or in combination with the other control parameters, the method includes pivoting at least one electric fan included in the fan array relative to the outer case 44 to change the direction of the at least one electric fan in response to the pressure measurements and/or the detected preprogrammed aircraft maneuver. The pivoting the fans 26A, 26B may be included in the configuration of the corresponding predetermined speed profile. The controller 34 is configured to direct at least one of the electric fans 26A, 26B to pivot in response to the pressure measurements from the plurality of sensors 32 and/or the detected preprogrammed aircraft maneuver.

Another embodiment of a fan system 220 in accordance with the present disclosure is shown in FIG. 4. The fan system 220 is substantially similar to the fan system 20 shown in FIGS. 1-3 and described herein. Accordingly, similar reference numbers in the 200 series indicate features that are common between the fan system 20 and the fan system 220. The description of the fan system 20 is incorporated by reference to apply to the fan system 20, except in instances when it conflicts with the specific description and the drawings of the fan system 220.

Like the embodiment in FIGS. 1-3, the fan system 220 replaces the primary fan of the gas turbine engine. The fan system 220 includes a fan array 222 as shown in FIG. 4. The fan array 222 is not circular in cross-section like the other embodiments. Instead, the fan array 222 is a rectangular array. In other words, the fan array 22 has a non-circular cross-section or a rectangular cross-section as shown in FIG. 4.

The outer case 244 of the engine that surrounds the fan array 222 has a non-circular cross-section as shown in FIG. 4. In the illustrative embodiment, the outer case 244 has a rectangular cross-section as shown in FIG. 4.

The fan array 222 includes a plurality of electric fans 226 that are arranged in the rectangular array as shown in FIG. 4. In the illustrative embodiment, the rectangular array has three rows of three electric fans 226. Each electric fan 226 has a rotor 260, blades 262, and an inner fan case or nacelle 264 as shown in FIG. 4.

In the illustrative embodiment, the rectangular shape of the fan array 222 may create gaps G between adjacent electric fans 226 as shown in FIG. 4. In the embodiment of FIG. 5, the fan system includes another fan array to fill in the gaps therebetween.

Another embodiment of a fan system 320 in accordance with the present disclosure is shown in FIG. 5. The fan system 320 is substantially similar to the fan system 20 shown in FIGS. 1-3 and described herein. Accordingly, similar reference numbers in the 300 series indicate features that are common between the fan system 20 and the fan system 320. The description of the fan system 20 is incorporated by reference to apply to the fan system 20, except in instances when it conflicts with the specific description and the drawings of the fan system 320.

Similar to the embodiment of FIG. 4, the fan system 320 replaces the primary fan of the gas turbine engine and includes a fan array 322 arranged in a rectangular array with a rectangular cross-section. In the illustrative embodiment, the fan system 320 includes a first fan array 322 and a second fan array 323 arranged axially aft of the first fan array 322 as shown in FIG. 5.

The second fan array 323 has a plurality of electric fans 326B that are arranged to fill in gaps G between the electric fans 326A of the first fan array 322 as shown in FIG. 5. The electric fans 326B of the second fan array 323 are arranged in the gaps G between the electric fans 326A of the first fan array 322.

In the illustrative embodiment, the rectangular array 322 has three rows of three electric fans 326A and the rectangular array 323 has two rows of two electric fans 326B as shown in FIG. 5. In other embodiments, the first and second fan arrays 322, 323 may have different number of electric fans 326A, 326B arranged in different non-circular configurations.

Another embodiment of a fan system 420 in accordance with the present disclosure is shown in FIG. 6. The fan system 420 is substantially similar to the fan system 20 shown in FIGS. 1-3 and described herein. Accordingly, similar reference numbers in the 400 series indicate features that are common between the fan system 20 and the fan system 420. The description of the fan system 20 is incorporated by reference to apply to the fan system 20, except in instances when it conflicts with the specific description and the drawings of the fan system 420.

Similar to the embodiments of FIGS. 4 and 5, the fan system 420 replaces the primary fan of the gas turbine engine and includes a fan array 422 with a parallelogram array or parallelogram cross-section as shown in FIG. 6. The fan array 422 is not circular in cross-section like the other embodiments. Instead, the fan array 422 is a parallelogram shape or parallelogram cross-section.

In the illustrative embodiment, the outer perimeter of the fan array 422 forms a rhombus shape. The outer case 344 of the engine that surrounds the fan array 322 has a non-circular cross-section as shown in FIG. 6. In the illustrative embodiment, the outer case 344 has a non-circular or parallelogram cross-section as shown in FIG. 5.

The fan array 422 includes a center electric fan 426A, a first set of electric fans 426B, and a second set of electric fans 426C as shown in FIG. 6. The center electric fan 426A has a fan axis that is aligned with the axis A of the gas turbine engine. The first set of electric fans 426B are spaced apart circumferentially around the center electric fan 426A.

The second set of electric fans 426C are located on opposite sides of the first set of electric fans 426A.

Embedded gas turbine engine applications may introduce distortion in the form of pressure gradients and swirl. A fan may need to survive going through different sectors of their circumference with varying level of pressure or swirl magnitudes, which may be difficult to manage for stall or aeromechanical behavior.

In the illustrative embodiment, the gas turbine engine includes a fan system 20, 220, 320, 420 in place of a primary mechanically driven fan. The fan system 20, 220, 320, 420 may allow for different speeds to adjust to various flows around the circumference to help offset the pressure and swirl distortions present. This allows for optimization of response not present with a single fan being embedded (without tip injection/recirculation at least).

The fan system 20, 220, 320, 420 allows the engine to adapt to or survive in distortion patterns better than with a single fan and even perhaps than some active technologies such as tip injection. The fan system 20, 220, 320 may also be acting to mitigate distortion such as with boundary layer ingestion. A large singular fan may be replaced with an array of smaller distributed ones 22, 222, 322, 422 including permitting different geometries within an airframe. As the fans 26A, 26B, 226, 326A, 326B, 426A, 426B, 426C use electric motors, the fans 26A, 26B, 226, 326A, 326B, 426A, 426B, 426C may be at different speeds and respond nearly instantaneously, as compared to mechanical gear/driveshaft configurations, which may have to be at the same speed and would be challenging to infinitely tune their relationship without complexity of continuously variable transmissions.

In other embodiments, aircrafts with mechanical fans may rely on inlet guide vanes/full inlet frames to help process incoming distortion and swirl. An off-the-shelf turbofan without such in an embedded application may struggle with distortion and swirl which would not allow an airframe to use its full envelope as intended. In response to the distortion, one may try to mitigate the distortion or try to somehow survive the distortion.

Tools, such as flow control or fins/vortex generators or plasma generators in the inlet, may limit the influence of distortion remaining before the distortion arrives at the fan. Fans with mistuning, improved damping, casing treatments, tip injection, or mechanical design tailored for distortion may empower the fan to be able to handle distortion. Imposing a keep out zone is also a way to respond to distortion. However, with the rise of electrical and hybrid configurations that provide additional architecture options, distributed fans may be included inside a turbofan assembly to replace the traditional fan to respond to distortion by varying individual fan speed to offset the distortion being experienced.

By nature, a single spinning fan may be axisymmetric as the fan faces non-axisymmetric distortions. These may have pockets of low pressure or local swirl vortices, or patterns of pressure that may create forcing on the aerofoil, which may lead to failure. Making a fan robust to these different inputs may be challenging, but if it is not made robust to distortion then its usefulness may be limited by having to avoid maneuvers or not be capable of the full intended envelope.

Instead, the illustrative embodiments use smaller distributed fans 26A, 26B, 226, 326A, 326B, 426A, 426B, 426C to increase velocity around the circumference locally and offset the distortion. In the illustrative embodiment, the control unit 24 includes sensors and/or control logic to adjust the fan array 22, 222, 322, 422 on the fly to different conditions or in anticipation of maneuvers/inputs/programming. This may allow the primary fan to be replaced.

The distributed fans 26A, 26B, 226, 326A, 326B, 426A, 426B, 426C may replace the primary fan entirely by an array of smaller ones. The turbofan may drive a generator, which then powers the small electric fans of the fan array 22, 222, 322, 422. This may be beneficial in applications where the arrangements of fans may take the shape of the airframe rather than enforcing a large cylinder within the body like as shown in FIGS. 4-6. In other embodiments, a second gas turbine engine or turboshaft may power the generator 50 or another generator coupled to the auxiliary fan system 20, 220, 320.

The distributed fans 26A, 26B, 226, 326A, 326B, 426A, 426B, 426C may be powered by a generator 50 like as shown in FIG. 2. The generator 50 may or may not be embedded in the engine 10. The space between the core 12 and the inner bypass flow path may house a large amount of wires and other supporting infrastructure and controls hardware if the generator 50 is embedded. These would be located aft of outlet guide vanes.

As shown in FIGS. 1-6, it may be possible that the entire primary fan is replaced with a fan array 22, 222, 322, 422 of electrically driven fans 26A, 26B, 226, 326A, 326B, 426A, 426B, 426C. The fans 26A, 26B, 226, 326A, 326B, 426A, 426B, 426C may be powered by a separate gas turbine turboshaft engine and generator elsewhere in the aircraft, or by other similar means—which could be more flexible for airframe integration and configuration. The electric fans 26A, 26B, 226, 326A, 326B, 426A, 426B, 426C may be powered by an embedded generator 50 and may be aided by a capacitor or battery 52 for short boosts (take-off, adverse situations) instead of continuous power such as during climb. In some embodiments, the auxiliary fan system 20, 220, 320 may enable shorter take-offs.

With distributed fans, it may also be possible to move away from a circular cross-section as in a typical single fan configuration. The benefits of an array to vary speed between the locations to respond to distortion is still feasible with non-circular arrays like as shown in FIGS. 4-6. The array may be modified to suit a partial airframe shape or be optimized for a particular inlet design.

In another embodiment, the fan system 320 includes a secondary fan array 323 forming another row of distributed fans 326B to help 'fill-in' the unused space between fans 326A. The overall annulus may be formed to suit the outer shape of the fans perimeter, in such that the fan system 320 may resemble pedals of a flower for a circular array or lobes—so that all air is directed into at least one fan 326A, 326B.

The fans 426A-C may be arranged in a diamond or parallelogram shape. The fans 426A-C may be arranged in any other shape to suit the airframe and inlet requirements as long as the distributed fans 426A-C allow for varying speed between themselves to respond to inlet flows. This may be particularly useful for a blended wing body or other non-conventional shaped aircraft (not a tube around a cylindrical engine).

In some embodiments, the fans may be able to tilt or change angle in a holder (like a spherical bearing) with an actuator or similar. In this way, the tilting fans may work to mitigate swirl or allow for more active tailoring of distortion response. These may be effectively used like a matched outlet guide vane system, used in place or combined with a matched or variable outlet guide vane setup.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
an outer case that extends circumferentially around an axis of the gas turbine engine to define a portion of a flow path of the gas turbine engine,
an engine core arranged radially inward of the outer case that extends along the axis of the gas turbine engine, the engine core including a compressor configured to rotate about the axis of the gas turbine engine to compress the air that flows into the engine core, a combustor configured to receive the compressed air from the compressor, and a turbine coupled to the compressor and configured to rotate about the axis of the gas turbine engine in response to receiving hot, high-pressure products of the combustor to drive rotation of the compressor, and
a fan system including a fan array located axially forward of the engine core that replaces a mechanically driven fan and a control unit coupled to the fan array, the fan array having a plurality of electric fans spaced apart around the axis of the gas turbine engine that are each configured to rotate about a fan axis, and the control unit configured to vary individually a rotation speed of each electric fan included in the fan array in response to a pressure differential in the flow path of the gas turbine engine upstream of the engine core to minimize pressure and swirl distortions in the gas turbine engine.

2. The gas turbine engine of claim 1, wherein the control unit includes a plurality of sensors arranged to measure pressure within the flow path of the gas turbine engine upstream of the engine core and a controller coupled to the plurality of sensors to receive pressure measurements from the plurality of sensors, the controller configured to increase the rotation speed of at least one electric fan included in the fan array in response to the pressure measurement being above a predetermined threshold.

3. The gas turbine engine of claim 2, wherein the controller is configured to decrease the rotation speed of at least one electric fan included in the fan array in response to the pressure measurement being below the predetermined threshold.

4. The gas turbine engine of claim 3, wherein the control unit further includes a memory coupled to the controller, the memory including a plurality of preprogrammed aircraft maneuvers that each correspond to a predetermined speed profile for the fan array, and the controller is configured to detect a preprogrammed aircraft maneuver included in the plurality of preprogrammed aircraft maneuvers on the memory and direct the fan array to change to the corresponding predetermined speed profile in response to detecting the preprogrammed aircraft maneuver.

5. The gas turbine engine of claim 1, wherein the control unit includes a controller and a memory coupled to the controller, the memory including a plurality of preprogrammed aircraft maneuvers that each correspond to a predetermined speed profile for the fan array, and the controller configured to detect a preprogrammed aircraft maneuver included in the plurality of preprogrammed aircraft maneuvers on the memory and direct the fan array to change to the corresponding predetermined speed profile in response to detecting the preprogrammed aircraft maneuver.

6. The gas turbine engine of claim 1, wherein the control unit includes a power supply coupled to each electric fan included in the fan array to provide power to each electric fan and drive rotation of each electric fan.

7. The gas turbine engine of claim 6, wherein the power supply includes a generator coupled to the engine core to produce electricity during use of the engine core and batteries coupled to the generator to store electricity produced by the generator.

8. The gas turbine engine of claim 1, wherein the plurality of electric fans includes a central electric fan with a fan axis aligned with the axis of the gas turbine engine and outer electric fans spaced apart around the axis of the gas turbine engine to surround the central electric fan.

9. The gas turbine engine of claim 1, wherein the outer case has a non-circular cross-section.

10. The gas turbine engine of claim 9, wherein the fan array is a rectangular cross-section.

11. The gas turbine engine of claim 9, wherein the fan array is a parallelogram cross-section.

12. The gas turbine engine of claim 1, wherein the fan system further includes a secondary fan array axially aft of the fan array and axially forward of the engine core, the secondary fan array including a plurality of electric fans arranged to fill gaps between adjacent electric fans included in the plurality of electric fans of the fan array axially forward of the secondary fan array.

13. A gas turbine engine comprising
an outer case that extends circumferentially around an axis of the gas turbine engine to define a portion of a flow path of the gas turbine engine,
an engine core arranged radially inward of the outer case that extends along the axis of the gas turbine engine, and
a fan system including a fan array located axially forward of the engine core and a control unit coupled to the fan array, the fan array having a plurality of electric fans spaced apart around the axis of the gas turbine engine that are each configured to rotate about a fan axis, and the control unit configured to vary individually a rotation speed of each electric fan included in the fan array in response to a pressure differential in the flow path of the gas turbine engine upstream of the engine core.

14. The gas turbine engine of claim 13, wherein the control unit includes a plurality of sensors arranged to measure pressure within the flow path of the gas turbine engine upstream of the engine core and a controller coupled to the plurality of sensors to receive pressure measurements from the plurality of sensors, the controller configured to increase the rotation speed of at least one electric fan included in the fan array in response to the pressure measurement being above a predetermined threshold and to decrease the rotation speed of at least one electric fan included in the fan array in response to the pressure measurement being below the predetermined threshold.

15. The gas turbine engine of claim 13, wherein the control unit includes a controller and a memory coupled to the controller, the memory including a plurality of preprogrammed aircraft maneuvers that each correspond to a predetermined speed profile for the fan array, and the controller configured to detect a preprogrammed aircraft maneuver included in the plurality of preprogrammed aircraft maneuvers on the memory and direct the fan array to change to the corresponding predetermined speed profile in response to detecting the preprogrammed aircraft maneuver.

16. The gas turbine engine of claim 13, wherein the plurality of electric fans includes a central electric fan with a fan axis aligned with the axis of the gas turbine engine and outer electric fans spaced apart around the axis of the gas turbine engine to surround the central electric fan.

17. The gas turbine engine of claim 13, wherein the outer case has a non-circular cross-section.

18. The gas turbine engine of claim 17, wherein the fan array is one of a rectangular cross-section and a parallelogram cross-section.

19. The gas turbine engine of claim 13, wherein the fan system further includes a secondary fan array axially aft of the fan array and axially forward of the engine core, the secondary fan array including a plurality of electric fans arranged to fill gaps between adjacent electric fans included in the plurality of electric fans of the fan array axially forward of the secondary fan array.

20. A method comprising
providing a gas turbine engine comprising an outer case arranged around an axis of the gas turbine engine, an engine core arranged radially inward of the outer case, and a fan system, the fan system including a fan array located radially inward of the outer case and axially forward of the engine core, wherein the fan array has a plurality of electric fans spaced apart around the axis that are each configured to rotate about a fan axis, conducting a flow of air through a flow path of the gas turbine engine, measuring pressure of the flow of air in the flow path of the gas turbine engine axially forward of the engine core, and varying a rotation speed of at least one electric fan included in the fan array in response to the pressure measurements being above or below a predetermined threshold to minimize pressure and swirl distortions in the gas turbine engine.

\* \* \* \* \*